July 13, 1926.
C. N. FAIRCHILD
1,592,090
COINCIDENTAL LOCK
Filed Nov. 10, 1924    2 Sheets-Sheet 1
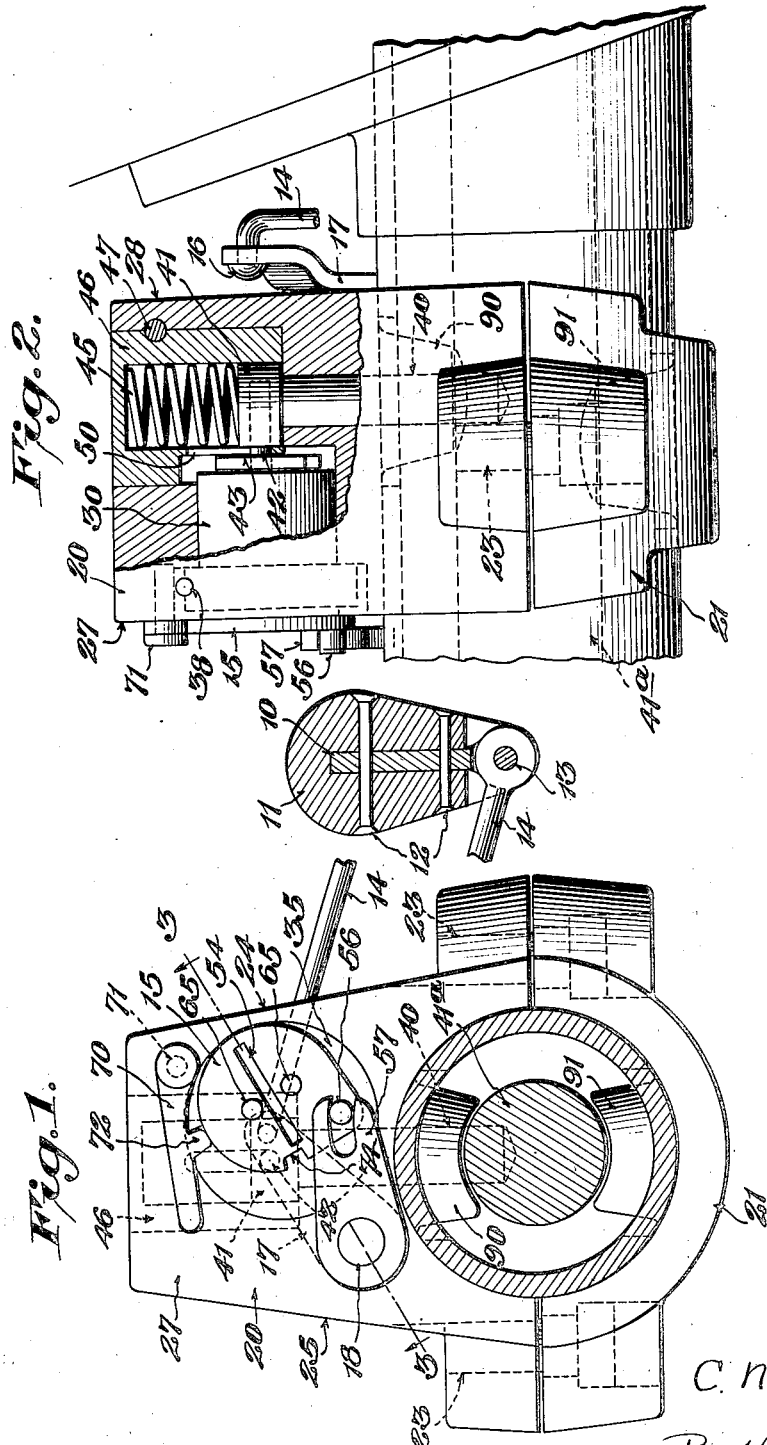
Inventor
C. N. Fairchild
By H H Snelling
His Attorney

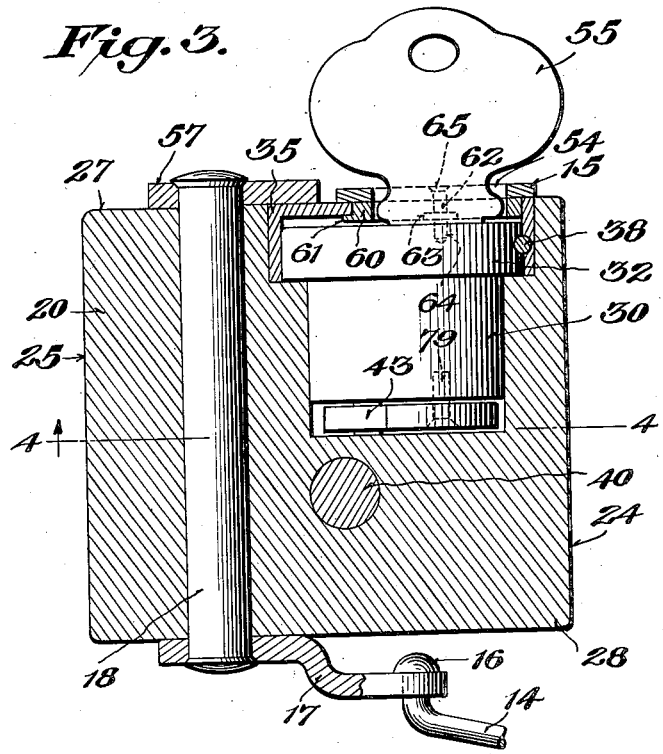
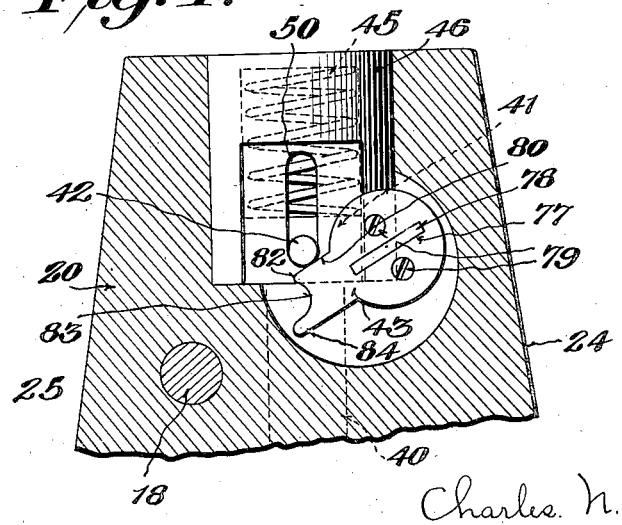

Patented July 13, 1926.

1,592,090

UNITED STATES PATENT OFFICE.

CHARLES N. FAIRCHILD, OF MILFORD, CONNECTICUT, ASSIGNOR TO FAIRCHILD LOCK CORPORATION, OF THE COUNTY OF NEW CASTLE, DELAWARE.

COINCIDENTAL LOCK.

Application filed November 10, 1924. Serial No. 749,022.

This invention relates to steering post locks of the type called by the Underwriters Laboratory "group one", i. e., a lock which will securely hold the steering post against movement while at the same time preventing the ignition circuit being closed.

The principal object of the present invention is to provide a simple and efficient coincidental lock for use with existing ignition lock systems, of such type as to meet the requirements of "group one", and in which the ignition cannot be closed without unlocking the steering rod, and in which the ignition cannot be opened without simultaneously locking the car.

In the drawings:

Fig. 1 is a view of the lock looking toward the cowl in line with the steering shaft, this view showing the steering shaft locked and the switch open.

Fig. 2 is a side view of the lock showing its location relatively to the cowl.

Fig. 3 is a section on line 3—3 of Fig. 1.

Fig. 4 is a section taken on line 4—4 of Figure 3.

The present invention as stated pertains to the use of already installed or at least separately locked and unlocked ignition control means, the key to which is shown in the drawing numbered 10, and which, in accordance with the present invention, is not to be removed from the ignition control means after installation of the present system. The forging 11 is slipped over the key 10 and is then permanently secured to such key as by the rivets 12. The forging 11 has a pivotal connection 13 with a rod 14 which has a preferably integral head 16 affording pivotal connection with a crank arm 17 on a shaft controlled indirectly by the turning of the key of the steering post lock.

The housing for the steering post lock consists in a main member 20 and a smaller saddle or cover member 21, these two members having a smooth bore between them snugly engaging the steering post tube or jacket. Bolts 23 permanently secure the two halves of the housing together, and also afford the means for securing the housing to the steering post jacket. The housing and its bolts are at the present time well recognized articles of manufacture and further description of them is believed unnecessary.

The major portion 20 of the housing has tapered sides 24 and 25, a plane face 27 and a tapered rear face 28 having the usual seven degree draft in order to permit drop forging.

A two diameter cylindrical bore opens to the front face 27, the smaller portion of the bore receiving the barrel 30 of a cylindrical lock of the type having a slightly enlarged head 32, which rests on the shoulder formed in the bore, but not filling the larger bore. The cap 35 rather snugly fits the enlarged portion of the lock and also snugly fits within the larger portion of the bore. Both the cap 35 and the lock are permanently secured in the housing by means of a pin 38.

The locking bolt 40 is adapted to pass through a hole in the steering post 41ª, as is fairly common practice, and this bolt 40 has a preferable integral head 41, which receives semi-permanently a small pin 42, by means of which a lever arm 43 secured to the rotating cylinder of the lock, retracts the bolt 40 against its spring 45.

I find it convenient to mount in a cylindrical bore, opening to the top of the housing, a hollow cylindrical plug 46 secured in place in the housing by means of a pin 47. The large central bore of this plug receives the head 41 of the locking bolt 40. The pin 42 passes through a slot 50 in the plug 46, this slot being centrally disposed on a plane face of the plug which provides space for the arm or lever 43 which operates the bolt and also permits the installation of the plug, bolt, and pin in the housing as a unit.

The disk 15 is slotted as at 54 to receive the key 55 of the steering post lock, and carries a stud 56 which operates a crank arm 57, similar generally to the crank arm 17, and like it permanently secured on the rock shaft 18. In order to position the disk 15 on the housing, I rivet this disk to a member 60 rotatably mounted in the cap 35 and having a small retaining flange 61 so that when the members 60 and 15 are riveted together they form in effect a rotatable collar on the cap 35. The rivets 62 which secure the members 15 and 60 together are of a somewhat unusual shape having a central head 63 snugly received in a small circular recess in the member 60 and having a positioning end 64 rather snugly fitting in a recess in the cylinder of the lock, there being two of these bolts 62, one on either side of the key slot. The second head 65 of the rivet 62 is formed by heading up the rivet into the counterbore recess of the disk 15. It will be noted that the disk 15, the inner member 60 and the cap 35 form a unit, and that when the cap 35 is secured in place by its pin 38, axial movement of the disk 15 is prevented; but this disk is permitted to rotate with the cylinder of the lock.

A detent 70 is pivoted at 71 to the casing and carries a small locking lug 72 fitting into a rectangular recess 74 in the disk 15 when the device is unlocked, there being a spring (not shown) surrounding the pivot 71 to hold the lug of the detent in the recess 74 when the steering post is unlocked, and for holding the detent against the periphery of the disk at other times. This detent, as customary in the art, is manually operated and is a "safety first" feature to prevent accidental locking of the steering post when the driver does not wish it locked.

A second means for securing the same end, namely, that of preventing accidental shooting of the steering post locking bolt, is provided by a peculiar configuration of the lever 43 which is secured to the rotatable cylinder of the lock. Referring now particularly to Figure 4, 77 is a small slot in the lever 43 snugly receiving a generally rectangular extension 78 of the cylinder whereby rotation of the cylinder insures rotation about its axis of the lever 43. To insure such cooperation, I find it convenient to provide screws or other fastenings 79 to secure the lever to the cylinder. In retracting the bolt the pin 42 rides on the smooth surface 80 of the lever until it reaches nearly the end of its unlocking movement. At this point the pin 42 rides over the rounded projection 82 and is then received in the rounded notch 83 between the projection 82 and a similar but longer projection 84.

This forms a very efficient means for preventing accidental shooting of the bolt. When the pin 42 is in the recess 83, any jar given the bolt 40 in a direction which might tend to shoot it to locking position is transmitted by the lever 43 to the wall of the housing, and the harder the blow, the more firm the binding of the parts. The only manner in which the bolt can be shot when the pin is in the recess 83 is by turning the key and causing the pin to first rise over the projection 82.

In order to position the housing on the steering post tube or jacket, I provide a boss 90 on the main portion of the housing and a smaller and opposite boss 91 on the smaller section of the housing, these two bosses fitting in circular holes in the jacket. By this rather simple means, I very effectively prevent a rotating movement of the housing about the tube or jacket with a consequent dislocation of the locking bolt with respect to the hole in the steering post tube. It will be noted that the locking bolt 40 passes centrally through the boss 90.

The operation is as follows:

The car has been running and the driver desires to leave it, possibly for only a few minutes. He naturally desires to open the ignition to prevent running of the engine while he is absent. To do so he must simultaneously lock the car. If the driver should try to manipulate the key 10 of the ignition he could and would move the rock shaft 18 by means of the rod 14 and crank 17 but such movement would be extremely slight as the slot in the crank arm 57 has its portion engaging the stud 56 normal to the line passing through the central of the stud and the attempts of the driver to move the key 10 would be to bind the crank 57 and disk 15. In order to open the ignition, the driver must first raise the detent 72 and then turn the key 55 so as to bring the projection 82 past the pin 42 which latter then rides down the edge 80, locking the bolt 40. Simultaneously with this movement, the disk 15, which is slotted to receive the key 55 and which necesarily moves only with the cylinder, by its engagement through the stud 56 with the crank arm 57 rocks the shaft 18 and since the crank 17 is also on the same shaft, this crank operates the rod 14, turning the key 10 through the pivotal connection of the forging 11 and rod 15.

To close the ignition it is also necessary to first manipulate the lock, as movement of the key 10 about its axis of movement is impossible without simultaneous rotation of the cylinder of the lock control by the key 55. Rotation of the lock by the key 55 causes a reverse movement of the cranks 57 and 17, throwing the key 10 to position to unlock the ignition system, i. e. to complete the circuit through the ignition system.

What I claim is:

1. In a device of the character described, a housing surrounding a steering post tube, a bolt adapted to lock the steering post against rotation, a cylinder lock for operating said bolt, a shaft controlled by movement of the lock, an ignition system, a key for operating same, and means secured to said key and operatively connected with said shaft whereby the opening and closing of the ignition system is controlled by movement of the steering post lock.

2. In a device of the character described, a housing mounted on a steering post tube, a shaft in said housing, a crank arm on said shaft, an ignition system, a key therefor, and means pivotally secured to said key and to said crank arm whereby movement of said said shaft controls the opening and closing of said ignition system.

3. In a device of the character described, an ignition governing key, a steering post lock, an arm operatively connected with said steering post lock, and a rod positively secured to said arm and permanently pivoted to the ignition key whereby opening and closing of the ignition system is governed by movement of the steering post lock.

4. In a device of the character described, a steering post locking bolt having an enlarged head, a pin laterally extending from said head, a hollow plug receiving the head of said bolt, a spring within said hollow plug and engaging the bolt head, and a lever for engaging said pin to withdraw the bolt from locking position, said lever having a notch therein to receive and hold said pin when the bolt is in unlocked position.

5. In a device of the character described, a cylinder lock, a rotatable member, means for causing simultaneous rotation of said member and the cylinder lock, a stud on said rotatable member, an oscillating shaft, a crank arm on said shaft, said crank arm having a slot therein to receive said stud, the wall of said slot engaging said stud being normal to a line drawn through the axes of said cylinder lock and said stud when the parts are in locked position.

6. In a device of the character described, an ignition governing key, a shaft, means operatively connecting said shaft and said ignition key, an arm on said shaft having a slot at its free end, a rotatable member, a stud on said rotatable member working within said slot whereby rotation of said member will operate said shaft through said crank arm, the walls of said slot engaging said stud in one position being normal to a line drawn through the centers of said rotatable member and said stud, whereby when in such position, movement of the shaft will bind said rotatable member and not cause its rotation, and whereby in such position, said rotatable member may have a slight rotation without moving said shaft.

7. In a device of the character described, a bolt, a lug extending from said bolt, a rotatable member, a lever arm carried by said member and engaging said lug to withdraw said bolt, said lever having at its free end a plurality of extensions having between them a notch to receive said lug when said bolt is in retracted position whereby pressure on said bolt when in retracted position to move it to locking position will cause said rotatable member to bind in its bearing, and whereby when said rotatable member is moved to advance the bolt to locking position, it must first further withdraw said bolt as it passes over one of the said projections.

8. In a device of the character described, a housing surrounding a steering post tube, a steering post locking bolt, a cylinder lock controlling said bolt, a cap surrounding the head of said bolt, a single means securing the cap and the lock to the housing, a rotatable collar slitted to receive the key for the bolt mounted on said cap, and means carried by said collar and engaging the cylinder of the lock to cause simultaneous turning of the collar, cylinder, and key, and mechanism carried by said collar for opening and closing the ignition system, said mechanism including means preventing operation of the cylinder locking key by movement of said mechanism.

In testimony whereof I affix my signature.

CHARLES N. FAIRCHILD.